J. B. HORRELL & A. S. BRYANT.
FRUIT ELEVATOR.
APPLICATION FILED JAN. 4, 1906.
1,028,823.
Patented June 4, 1912.
2 SHEETS—SHEET 1.
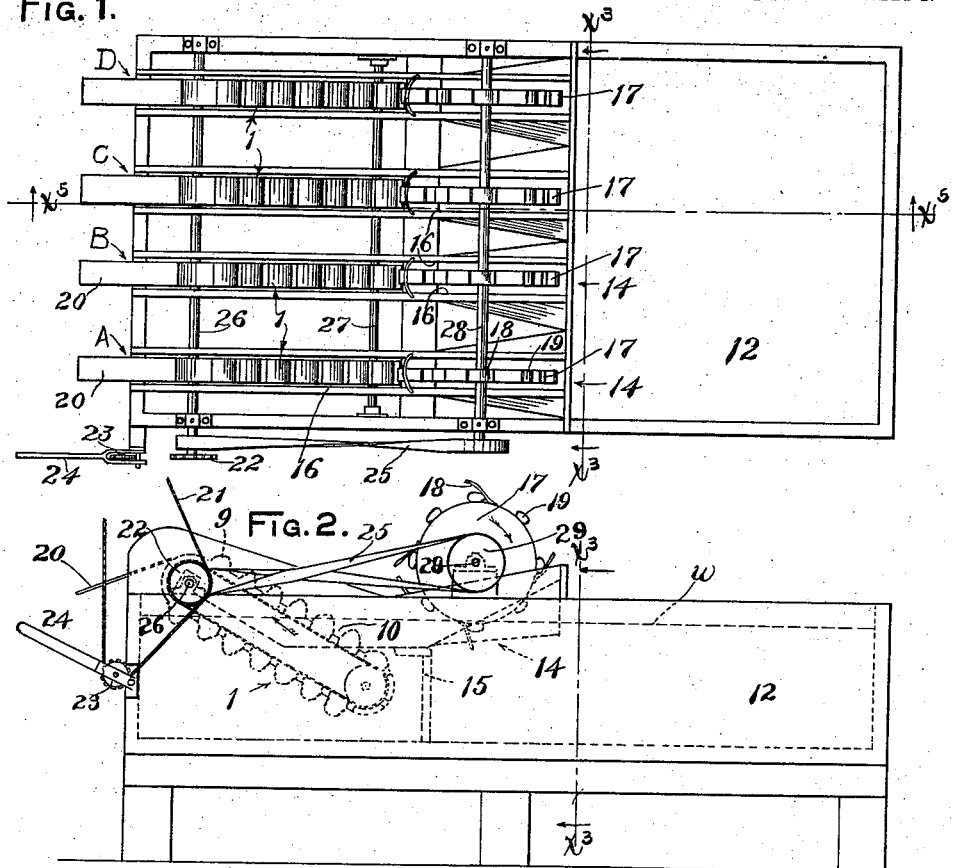
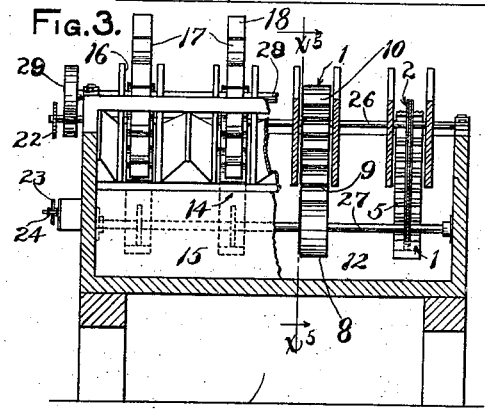
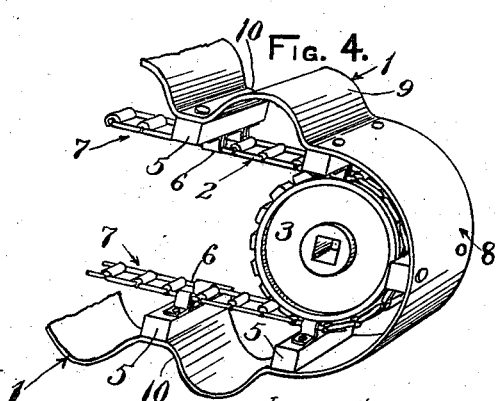
Witnesses:
Chester H. Roake.
J. Townsend.
Inventors
John B. Horrell.
Arthur S. Bryant
by James R. Townsend
their atty.

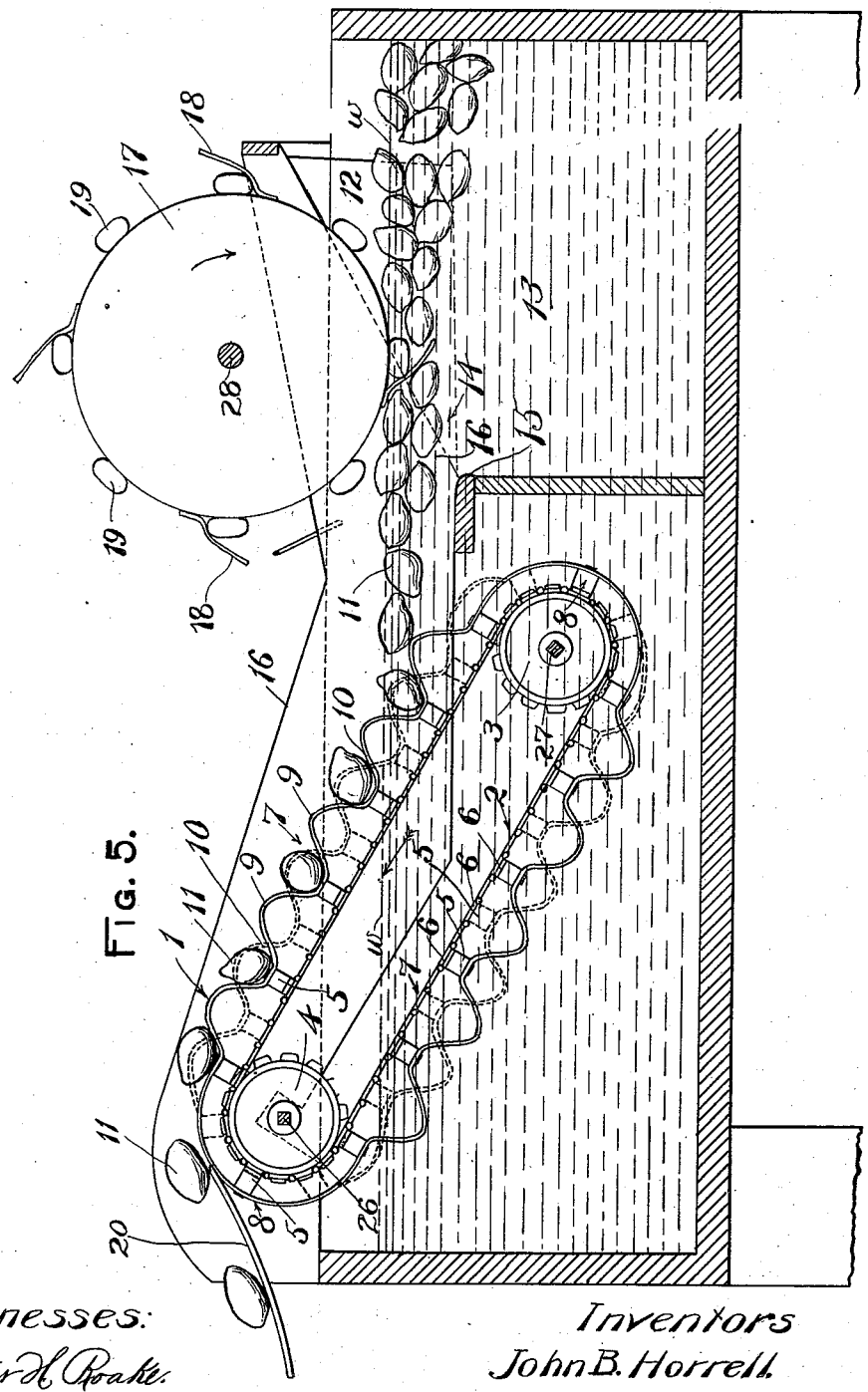

UNITED STATES PATENT OFFICE.

JOHN B. HORRELL AND ARTHUR S. BRYANT, OF SANTA PAULA, CALIFORNIA, ASSIGNORS, BY DIRECT AND MESNE ASSIGNMENTS, TO H. K. MILLER MANFG. CO., OF GLENDORA, CALIFORNIA, A CORPORATION OF CALIFORNIA.

FRUIT-ELEVATOR.

1,028,823.     Specification of Letters Patent.     Patented June 4, 1912.

Application filed January 4, 1906. Serial No. 294,504.

*To all whom it may concern:*

Be it known that we, JOHN B. HORRELL and ARTHUR S. BRYANT, citizens of the United States, residing at Santa Paula, in the county of Ventura and State of California, have invented a new and useful Fruit-Elevator, of which the following is a specification.

This invention is more particularly designed for delivering lemons to a brushing or cleaning apparatus, but may be used for elevating other kinds of fruits.

It is necessary in handling lemons that the same shall not be abraded or bruised, and an object of this invention is to provide an elevator which will separate lemons individually from a mass of lemons and will deliver them in an appropriate manner without injury to the brushing or cleaning machine. It is to be understood, however, that we do not limit the invention to any particular use, nor to the specific construction hereinafter set forth.

The invention includes an elevator for supplying individual fruits in rapid succession to a chute or other device, and also includes means for so supplying fruits to a plurality of such devices with slight care and attention.

The invention relates to that form of fruit-elevator which comprises a tank having a body of liquid therein, a curved guide below the liquid level of the tank, a curved guide above said level and a conveyer to take fruits floating in the tank and to deliver them outside of the tank.

In this invention the conveyer comprises two traveling belts one outside the other, said belts being spaced apart and fastened to each other at intervals and running around said guides, the outer belt being adapted to be bent outward to form outwardly projecting yielding loops whereby pockets are formed between each of the two adjacent loops; the portion of said outer belt which passes around the guide being thereby bent outwardly to initiate outward bends for the loops, but drawn taut, so that there are no loops excepting between the guides, the loops being formed by means of said guides, which initiate the outward bend, and the relatively short inner belt 2 and the blocks 5 which are relatively spaced at less distance apart than the length of the outer belt between the blocks, the loops therefore disappearing as the belt goes around the guide and re-appearing between the guides.

Said invention also comprises various parts, features of novelty and combinations hereinafter set forth.

The accompanying drawings illustrate the invention.

Figure 1 is a plan view of a machine embodying this invention constructed with four individual elevators supplied from one tank; parts are broken away for clearness of illustration. Fig. 2 is a side elevation of the same. Fig. 3 is a sectional elevation from the line $x^3$—$x^3$, Figs. 1 and 2, parts being broken away for clearness of illustration. Fig. 4 is a fragmental perspective detail of the conveyer of the elevator. Fig. 5 is a sectional detail from line $x^5$—$x^5$, Figs. 1 and 3, looking in the direction of the arrow.

The inclined traveling belt 1 is arranged aslant to travel around horizontal axes and means are provided for looping the uppermost limb of the belt outward to form V shape pockets along such limb between the bends; said belt being applicable for use in a tank adapted to contain a body of liquid to submerge the lower end of such upper limb, whereby floating bodies may be segregated by the outwardly projecting yielding loops and be caught in the pockets formed of said belt in the liquid below the liquid level and may be carried upward thereby without danger of bruising. The means shown in the drawings for looping the straight limb of the belt consist of an inner belt 2, trained around pulleys 3, 4, that have horizontal axes at different levels and serve as curved guides for the inner belt, and standards or blocks 5 between the belts 1 and 2 to hold said belts apart at intervals. Said standards 5 form rigid supports for the outer or pocket-forming belt 1, being rigidly mounted on links 6 which constitute the belt 2. Said pocket-forming belt is made of ordinary belting material that has sufficient body to prevent the belt from drooping between the blocks.

The pulleys 3, 4, are set at different levels so that the belts slant upward from 3 to 4. By reference to Fig. 5 it will be seen that where the belts pass around the pulleys the extensions formed by the standards or blocks 5 take up the slack of the outer belt 1, and that in the upper straight limb or portion of the belt 7 the tops of the standards are brought closer together, thereby causing the outwardly bent portion of the outer belt on leaving the pulley to be bent still more, thus forming upwardly-extending loops 9 on the upper slanting side; thus forming between the same and over the blocks or standards 5 pockets 10 for receiving and carrying the individual fruits 11. Means are provided for feeding fruits to the lower end of the upper side or limb 7 of the looped belt. Said feeding means comprise a tank 12 containing a body of liquid 13, as water, extending above the level of the lower or receiving pulley 3 such a distance that if lemons having a specific gravity less than the water are placed in the tank they can be floated along to position where they will be picked up by the first loop of the outer belt 1 as it comes from the bend at 8 formed by the lower pulley 3.

14 indicates a receiver or guide in the form of a chute above a bulk-head 15, which is below the liquid level $w$ of the tank sufficiently to allow the lemons to float to the upper limb of the belt 1, above the lower pulley at the place where the loops take form.

16 indicates the sides of the chute.

17 is a feeding wheel mounted between the sides 16 of the chute, and provided with flexible and soft yielding flippers 18 which may be formed of short strips of rubber belting and projecting cushions 19 for driving the floating fruit 11 forward into the chute into position to be caught by the ascending loops 9.

20 designates a discharge chute to which the fruits are delivered from above the upper or delivery pulley 4.

21 is a driving sprocket chain around the sprocket wheel 22, and thrown into and out of gearing by the idler 23 carried by lever 24.

25 is a belt driven from shaft 26 of the upper pulley and driving the feeder wheel 17. Each of the units A, B, C, D, and any further number of units which may be applied in the machine will be driven from said shaft 26.

27 is a common shaft on which the lower pulleys 3 of the several units are carried.

28 is a common shaft for the several feeder wheels 17, said shaft being driven by pulley 29.

In practical operation, the fruit will be gently emptied from the boxes, or other containers in which the same has been brought from the tree to the elevator, and when the machine is put into operation, the rotating wheel 17, by means of its flippers 18 and cushions 19 will gently push the fruit along toward the buckets formed by the looping upwardly-moving upper limb 7 of the belt 1.

The flippers 18 form yielding extensions to yieldingly act on the more deeply submerged fruit, while the cushions 19 act more positively on the fruit at the top. As the fruits approach the looped belt, further outwardly projecting yielding loops constantly form beneath them and above the wheel 3, thus gently separating the fruits from each other and carrying them upward singly, as shown in Fig. 5, until they come to a determined level above the upper pulley 4. At this point the increased distance between the outer ends of the blocks or standards 5 causes the loops 9 to successively change their form to discharge the fruit onto the chute 20 down which the same will gently guide to the cleaning apparatus, not shown.

In Fig. 3 of the drawings, the outer or pocket forming belt of the elevator is broken away and the feeding wheel 17 is omitted from the elevator at the extreme right; the outer belt is shown in the elevator next thereto, the feeding wheel 17 being omitted. In the two elevators at the left, the feeding-wheel and other parts of the specific elevators are shown intact.

We claim:—

1. A fruit elevator comprising a tank adapted to contain liquid, two pulleys, one in the tank below the liquid level and the other above the liquid level, an inner belt on said pulleys, an outer flexible belt secured to the inner belt by blocks common to both belts, said blocks being spaced apart to form loops in the limb between said pulleys thereby forming V-shaped pockets between the pulleys and over said blocks, and means for guiding the belt.

2. An elevator comprising a tank adapted to contain liquid, a belt in the tank having an upper limb thereof partially below the liquid level, means for looping such limb and the belt below the liquid level at one portion and unlooping the same above the liquid level at another portion, and said loops forming V-shaped pockets between the pulleys, and means for driving the belt.

3. An elevator comprising two belts, one of said belts being inside the other, blocks between the belts to hold them apart at intervals, V-shaped pockets on the blocks, a tank adapted to contain liquid, and means for holding the belts aslant partially below the liquid level, the inner belt comprising an upper limb having a curved portion below the liquid level and a straight portion extending from said curved portion upwardly across the plane of the liquid level, forming loops in the outer belt extending in line from below to above the liquid level and means for driving the belts.

4. The combination of two pulleys arranged on horizontal axes at different levels, a belt on said pulleys, connectors at intervals on said belt, a belt carried by said connectors outside of and spaced apart from the first named belt, a tank adapted to contain liquid to partially submerge the upper limb of the outer belt whereby liquid may be made to serve as feeding means below the top of the upper pulley, and V-shaped pockets on the connectors.

5. In an elevator comprising a tank adapted to contain liquid, a pulley extending below the liquid level of the tank, a pulley above said level, a conveyer comprising two belts, one outside the other, spaced apart from and fastened to each other at intervals and running around said pulley; and a wheel provided with flexible flippers on its rim and adapted to run in said tank below said level to move floating contents of the tank toward the outer belt.

6. In an elevator comprising a tank adapted to contain liquid, and a conveyer for elevating fruit from the liquid; a wheel provided with yielding flippers on its rim, said wheel being adapted to run in the liquid to gently move floating contents of the tank toward the conveyer.

7. A conveyer comprising a traveling belt bent around horizontal axes and arranged aslant to travel around said axes, and means for looping the uppermost limb of the belt outward to form V-shaped pockets along such limb between the bends.

8. A conveyer comprising a traveling belt bent around horizontal axes and arranged aslant to travel around said axes; means for looping the uppermost limb of the belt outward to form V-shaped pockets along said limb between the bends, said means comprising a belt inside the traveling belt; curved guides around which the inner belt is trained and supports between the belts to hold said belts apart at intervals, said belt being made of material that has sufficient body to prevent the belt from drooping between the supports.

In testimony whereof, we have hereunto set our hands at Santa Paula, California, this 26th day of December, 1905.

JOHN B. HORRELL.
ARTHUR S. BRYANT.

In presence of—
C. C. TEAGUE,
R. L. CHURCHILL.

---

Copies of this patent may be obtained for five cents each, by addressing the "Commissioner of Patents, Washington, D. C."